(12) United States Patent
Guo

(10) Patent No.: US 8,290,504 B2
(45) Date of Patent: Oct. 16, 2012

(54) METHOD FOR REALIZING BROADCAST COMMUNICATION AND DATA COMMUNICATION IN A CELLULAR NETWORK

(75) Inventor: Zihua Guo, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1165 days.

(21) Appl. No.: 11/860,189

(22) Filed: Sep. 24, 2007

(65) Prior Publication Data

US 2008/0076443 A1 Mar. 27, 2008

(30) Foreign Application Priority Data

Sep. 22, 2006 (CN) .......................... 2006 1 0139309

(51) Int. Cl.
*H04W 72/00* (2009.01)
(52) U.S. Cl. ........................................ 455/454; 455/450
(58) Field of Classification Search .................. 455/454, 455/450, 414.1, 414.2, 412.2, 3.02, 3.01
See application file for complete search history.

(56) References Cited

U.S. PATENT DOCUMENTS

| | | | | |
|---|---|---|---|---|
| 6,748,218 B1 * | 6/2004 | Johnson et al. | ............... | 455/446 |
| 2006/0218298 A1 * | 9/2006 | Knapp et al. | .................. | 709/238 |
| 2006/0270457 A1 * | 11/2006 | Lord | ............................ | 455/558 |
| 2009/0028109 A1 * | 1/2009 | Huang et al. | .................. | 370/330 |

FOREIGN PATENT DOCUMENTS

| | | |
|---|---|---|
| CN | 1798319 | 7/2006 |
| EP | 1 662 825 A1 | 5/2006 |
| EP | 1 758 419 A1 | 2/2007 |
| GB | 2 439 813 A | 1/2008 |
| GB | 2 445 819 B | 2/2009 |
| JP | 2000-224648 | 8/2000 |
| JP | 2004-032604 | 1/2004 |
| JP | 2004-135283 | 4/2004 |
| JP | 2006-238489 | 9/2006 |
| WO | WO 2005/043829 A2 | 5/2005 |
| WO | WO 2006/135710 A2 | 12/2006 |

OTHER PUBLICATIONS

Office Action dated Dec. 15, 2009 for Japanese Application No. 2007-0244852 filed Sep. 24, 2007, 2 pages.
Office Action dated Jun. 19, 2009 for Chinese Application No. 200610139309.4 filed Sep. 22, 2006, 4 pages.
Office Action dated Jan. 31, 2008 for GB Application No. 0718621.6 filed Sep. 24, 2007, 4 pages.
Office Action dated Jun. 8, 2011 for German Application No. 10 2007 045 626.5, 25 pages.

* cited by examiner

*Primary Examiner* — Melody Mehrpour
*Assistant Examiner* — Emem Stephen
(74) *Attorney, Agent, or Firm* — Patterson Thuente Christensen Pedersen, P.A.

(57) ABSTRACT

A cellular network system and a method for realizing broadcast communication and data communication utilize a cellular network to carry out video data broadcast and data communication with terminals. The cellular network system includes a central control node and base stations. The central control node generates control information to control the base stations to broadcast video broadcast data to the terminals during the time slot for video data broadcast, and said control information includes frequency allocation information and time slot allocation information. With the cellular network system and method thereof for realizing video broadcast and data communication in the cellular network, video broadcast and data communication are incorporated in the sectorized cellular network while avoiding a lowered efficiency of frequency spectrum use during video broadcasting due to sectorization.

9 Claims, 5 Drawing Sheets

METHOD FOR REALIZING BROADCAST COMMUNICATION AND DATA COMMUNICATION IN A CELLULAR NETWORK

RELATED APPLICATION

The present application claims priority to Chinese Application No. 200610139309.4 filed Sep. 22, 2006, which is incorporated herein in its entirety by reference.

BACKGROUND OF THE INVENTION

1. Field of the Invention

The present invention relates to a method and an apparatus for realizing broadcast communication and data communication in a cellular network, and in particular to a cellular network system incorporating a data communication network and a video broadcast network, as well as the method and the apparatus thereof.

2. Description of the Prior Art

Existing mobile communication networks have been employing cellular architectures. Such cellular architectures generally support only voice and data unicast services. With the rise in demand for mobile audio and video, mobile video broadcast services have increased in the market of mobile communication. Especially, as the wideband wireless technology has developed rapidly, more and more discussion is directed to how to incorporate conventional mobile communication networks, wireless Internet data networks and broadcast networks in the next generation of wireless networks.

FIG. 1 shows a schematic diagram of a network architecture supporting mobile video broadcast service. Currently, two methods are often adopted to support mobile video broadcast service and described as follows.

The first method comprises employing an individual broadcast network, such as a DVB-H or DMB system, to support mobile video broadcast service. In this method, developed video content is stored in a content server by a content provider in the DVB-H or DMB system, then distributed to broadcast stations at respective locations via Internet (or a dedicated network) or a satellite system, and finally broadcast to terminals such as mobile phone, PDA, notebook computer or even in-vehicle TV, via the transmitting towers of the broadcast stations. These systems are generally independent of existing cellular networks, incapable of supporting mobile communication and need the establishment of a corresponding cellular network in the case of mobile communication. As a result, it requires two types of independent networks to perform mobile communication and video broadcast simultaneously, thereby resulting in a high cost.

The second method is to send video service as data of the same type as that of communication data by using the method of streaming media in the existing cellular networks, for example, GPRS, CDMA, or the like, so as to provide video broadcast service in cellular networks. In this case, the video content is first stored in a content server by a content provider and then broadcast to terminals over the cellular networks in the manner of streaming media. With the second method, however, since the conventional cellular networks are not designed for video broadcast, compared with the first method, each cell has to send multiple copies individually upon the transmission of the same content in order to support broadcast service. This results in inefficient use of the frequency spectrum.

In addition, most existing cellular networks are sectorized to reduce interference and expand capacity. When sectorized, each sector usually uses partial frequency spectrum, and it is thus more difficult to carry out video broadcast using the current sector-based cellular networks.

SUMMARY OF THE INVENTION

The object of the present invention is to provide a cellular network system and a method for realizing broadcast communication and data communication in the system, which can utilize a cellular network to implement broadcast communication and data communication.

According to an aspect of the present invention, there is provided a cellular network system comprising a central control node which is connected to a plurality of base stations and generates control information to control the plurality of base stations to send video broadcast data and perform data communication with terminals in the network; and a plurality of base stations which obtain the video broadcast data, and based on the control information, sends the video broadcast data to the terminals via wireless channels and performs data communication with the terminals, wherein the control information includes frequency allocation information and time slot allocation information.

According to another aspect of the present invention, there is provided a method for realizing broadcast communication and data communication in a cellular network. The method includes the steps of: a central control node generating control information including operating frequency band and operating time, which are allocated to respective sectors covered by respective base stations in the network and used for the broadcast communication and the data communication, respectively, and sending the control information to respective base stations; based on the control information, each of the base stations controlling its covered sectors to send broadcast data within the operating frequency band and operating time allocated for the broadcast communication and transmitting and receiving communication data within the operating frequency band and operating time allocated for the data communication.

With the present invention, it is possible to implement both broadcast communication and data communication, and fuse video broadcast and data communication in a sectorized cellular network, while avoiding a lower efficiency of frequency spectrum use during video broadcasting due to sectorization. On the other hand, since the present invention incorporates broadcast communication and data communication within one cellular network system, it is convenient to dynamically adjust frequency spectrum and/or time resource occupied by broadcast communication and data communication so as to improve the utilization efficiency of the frequency spectrum.

BRIEF DESCRIPTION OF THE DRAWINGS

The above objects, advantages and features of the present invention will be apparent from the following detailed description on the preferred embodiments taken in conjunction with the drawings in which.

DETAILED DESCRIPTION

Hereafter, the embodiments of the present invention will be explained in detail with reference to the figures, and details and functions unnecessary to some embodiments of the invention may be omitted in the description in order not to obscure understanding of those embodiments.

The cellular network system and the method for realizing video broadcast and data communication by using the system of the embodiment will be explained in connection with the figures.

Figure 1:
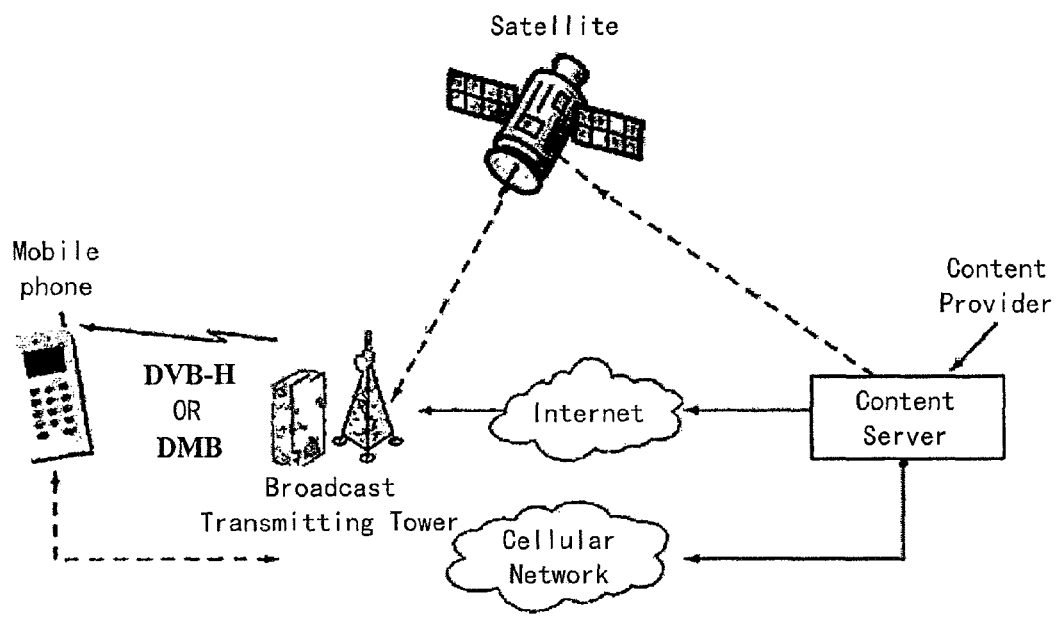
FIG. 1 is a schematic diagram showing a network architecture which itself supports mobile video broadcast service.
Figure 2:
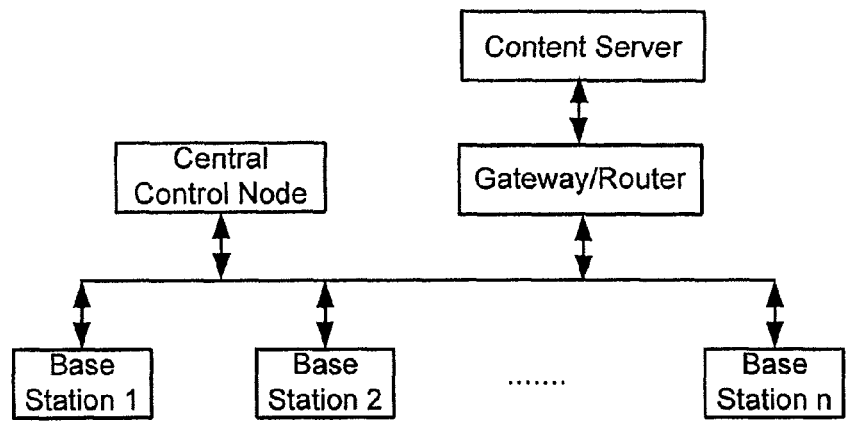
FIG. 2 is a schematic diagram showing the configuration of a cellular network according to one embodiment of the present invention.

FIG. 1 is a schematic diagram showing the overall configuration of the cellular network system according to one embodiment of the present invention. As shown in FIG. 2, the cellular network system according to one embodiment includes a central control node, base stations 1, 2, . . . n, a content server and a gateway/router.

The central control node is connected to each of the base stations, respectively, and generates control information, which includes frequency allocation information and time slot allocation information. The control information serves to control each of the base stations to send video broadcast data to terminals in the network and to control the base station to perform data communication with the terminals.

Each of the base stations obtains the video broadcast data from the content server via the gateway/router and sends the data to the terminals via wireless channel. The base stations also perform data communication with an office end (not shown) and the terminals.

Each base station is sectorized in this embodiment. That is, the coverage of each base station is divided into sectors. The coverage of one base station can be divided into m sectors, where m≧1. In the case of m>1, the coverage of a base station is divided into m sectors, and a directional antenna is adopted to transmit and receive data in each sector. For m=1, the entire coverage of a base station can be view as one large sector, and an omni-directional antenna is adopted for data transmission and reception. In order to simplify the description, embodiments of a base station with three sectors will be described herein, though those skilled in the art will recognize that the number of sectors may be any number greater than or equal to one.

Figure 3:
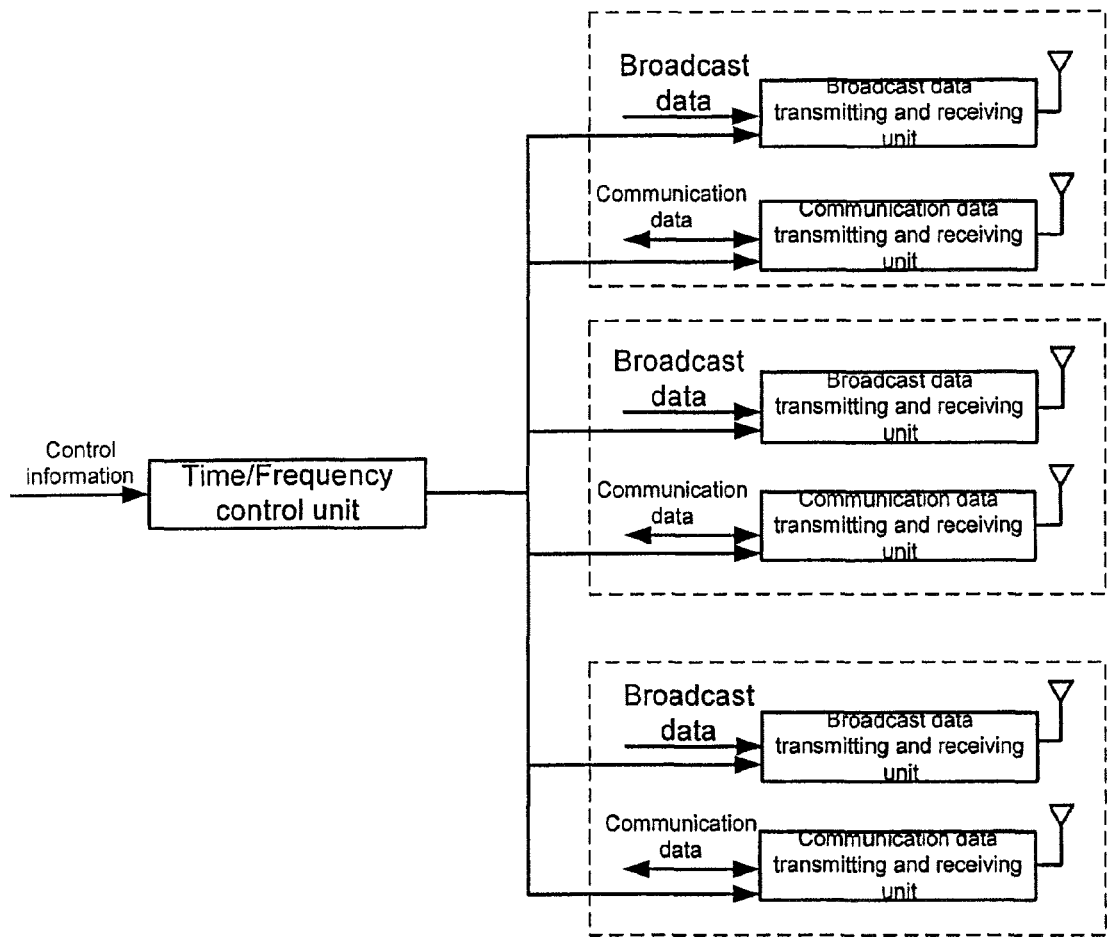
FIG. 3 is a schematic diagram showing the configuration of a base station in the cellular network according to one embodiment of the present invention.

For the base station with three sectors, the coverage is divided into three sectors each of which uses a directional antenna for data transmission and reception. As shown in FIG. 3, in the present embodiment, it is necessary to provide broadcast data transmitting and receiving devices and communication data transmitting and receiving devices corresponding to each sector respectively in the base station in order to transmit the broadcast data as well as transmit and receive the communication data in each sector in the base station. The broadcast data transmitting and receiving device and the communication data transmitting and receiving device within the same sector can share a directional antenna for data transmission and reception. Each of the broadcast data transmitting and receiving device and the communication data transmitting and receiving device can also use its own directional antenna to transmit and receive data. Further, since sectorization between sectors is not required for the broadcast data, it is possible to use the same antenna, which is not shared with the communication data, to transmit the broadcast data in the three sectors covered by one base station.

In addition, in order to transmit the broadcast data as well as transmit and receive the communication data in each sector covered by the base station, an associated time/frequency control device is provided in the base station to control operating frequency and the operating time slot of the broadcast data transmitting and receiving devices and the communication data transmitting and receiving devices corresponding to each sector.

Figure 4:
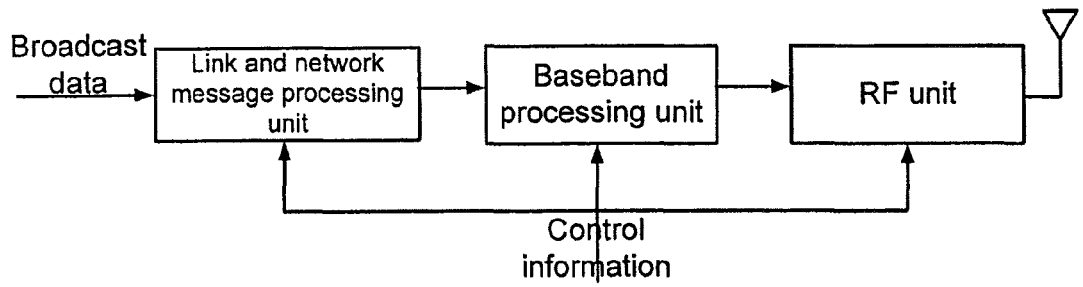
FIG. 4 is a schematic diagram showing the configuration of a broadcast data transmitting and receiving device in the base station according to one embodiment of the present invention.
Figure 6:
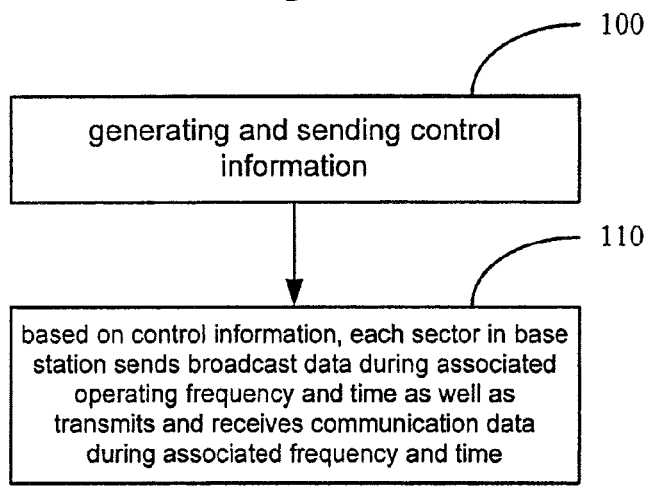
FIG. 6 is a flowchart showing a method for transmitting broadcast data as well as transmitting and receiving communication data by use of a cellular network according to one embodiment of the present invention.

FIG. 4 shows a block diagram of the broadcast data transmitting and receiving device corresponding to each sector in the base station according to the embodiment. As shown in FIG. 6, the broadcast data transmitting and receiving devices may include a link and network message processing unit, a baseband processing unit and a radio frequency (RF) unit. The link and network message processing unit is configured to acquire the video broadcast data from the content server, control the transmission of the broadcast data in accordance with a link protocol and packetize the video broadcast data to associated broadcast data packets. The baseband processing unit performs baseband signal processing on the broadcast data packets to be sent to the terminals so as to form baseband broadcast signals. The RF unit converts the baseband broadcast data packets into associated RF broadcast signals to be sent to the terminals in the network.

Figure 5:
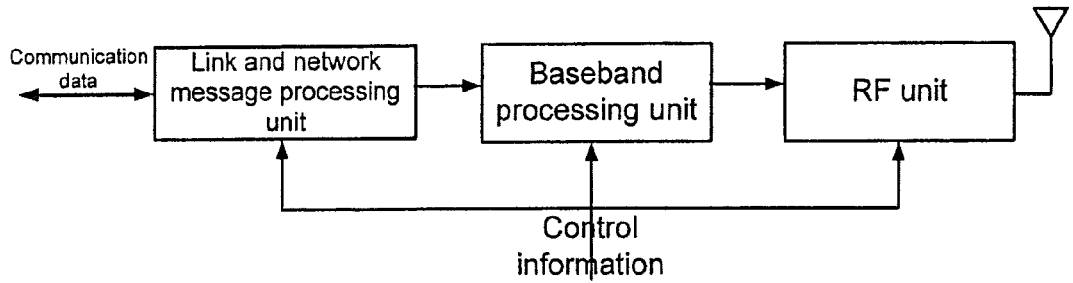
FIG. 5 a schematic diagram showing the configuration of a data communication transmitting and receiving device in the base station according to one embodiment of the present invention.

FIG. 5 shows a block diagram of the communication data transmitting and receiving device corresponding to each sector in the base station according to the embodiment. As shown in FIG. 5, the communication data transmitting and receiving device may include a link and network message processing unit, a baseband processing unit and a radio frequency (RF) unit. The link and network message processing unit is configured to control the transmission of the communication data in accordance with a link protocol and packetize the communication data to associated data packets. The baseband processing unit may encode and modulate the communication data from the link and network message processing unit as well as decode and demodulate the communication data from the RF unit. The RF unit may convert the baseband communication signals to be sent to the terminal into associated RF broadcast signals as well as convert the received RF broadcast signals from the terminals into associated baseband communication signals.

FIG. 6 shows a flowchart of a method for transmitting broadcast data as well as transmitting and receiving communication data by the cellular network according to one embodiment. At step 100, the central control node generates the control information and sends it to the time/frequency control unit in each base station. The control information includes the operating frequency and operating time slot for the broadcast data transmitting and receiving devices and the communication data transmitting and receiving device corresponding to each sector allocated to each base station by the central control node. At step 110, based on the control information provided by the central control node, the time/frequency control unit in each base station controls the broadcast data transmitting and receiving device corresponding to each sector in the base station to transmit the broadcast data within the associated operating frequency and operating time as well as controls the communication data transmitting and receiving device corresponding to each sector in the base station to transmit the communication data within the associated operating frequency and operating time.

In one embodiment, the control information from the central control node may include the resource (frequency and time) allocated for associated operations performed by the broadcast data transmitting and receiving device and the communication data transmitting and receiving device of each sector in a respective base station. The following is a description of specific embodiments of resource allocations.

According to the resource allocation scheme of one embodiment, data communication and broadcast communication are separated in the time domain. The frequency band for broadcast communication in the cellular network system can be all or part of the frequency band for the cellular network system. The frequency band allocated to broadcast communication is shared in the cellular network system. That is, the sectors of all the base stations in the cellular network system utilize the same frequency band to transmit broadcast data.

When the frequency band for broadcast communication is all or part of the frequency band for the cellular network system, the entire frequency band of the cellular network is allocated to each base station in the cellular network system according to a multiplexing factor, and then the associated frequency band is further allocated to each sector based on the number of sectors within this base station. For example, if the frequency band of the cellular network is 20 MHz and the multiplexing factor is three, the base station of each cell in the cellular network is allocated with 6.7 MHz, and each sector is allocated with 2.2 MHz in the case of the base station containing three sectors. During broadcasting, the frequency spectrum used by all antennas of all the base stations can be the entire bandwidth of 20 MHz, or only part of it.

On the other hand, if the frequency band allocated for broadcast communication is part of the entire bandwidth of the cellular network, the remaining frequency band can be allocated to the base stations in the cellular network according to the multiplexing factor. Then, each sector is allocated with the associated frequency band based on the number of sectors covered by each base station. Since the frequency band used for broadcast communication is different from that for data communication, it is possible to carry out both broadcast communication and data communication simultaneously in a time slot for broadcasting. For example, if the frequency band of the cellular network is 20 MHz, the frequency band allocated for broadcast communication is "a" MHz and the multiplexing factor is three, the base station of each cell in the cellular network is allocated with (20−a)/3 MHz, and each sector is allocated with (20−a)/9 MHz in the case of the base station containing three sectors.

Figure 7:
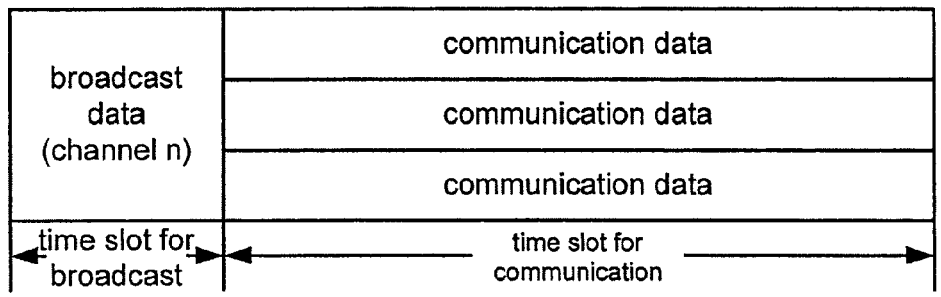
FIG. 7 is a schematic diagram showing a frame structure in an example of the first resource allocation instance of the present invention.

FIG. 7 is a schematic diagram showing a frame structure transmitted by the base station in one embodiment. The central control node divides the frame into a broadcast time slot for transmitting and receiving broadcast data and a communication time slot for transmitting and receiving communication data. In the broadcast time slot, the broadcast data transmitting and receiving devices corresponding to each sector in the base station may use a frequency band allocated in advance to transmit broadcast data (broadcast content on the same channel or different channels). In the communication time slot, the communication data transmitting and receiving device corresponding to each sector in the base station may use a frequency band allocated in advance to transmit communication data. In this example, allocation of the frequency band is uniform. If the frequency band for data communication by the base station is WB and the base station covers three sectors, WB is evenly divided into three subbands, WB1, WB2 and WB3, with the communication data transmitting and receiving device for the sector 1 transmitting and receiving communication data at WB1 in the communication time slot, the communication data transmitting and receiving device for the sector 2 transmitting and receiving communication data at WB2 in the communication time slot, and the communication data transmitting and receiving device for the sector 3 transmitting and receiving communication data at WB3 in the communication time slot.

With such an allocation scheme, it is possible to transmit one or more broadcast MAC frames on the same channel or multiple broadcast MAC frames on different channels within one broadcast time slot. Similarly, one or multiple data MAC frames can be transmitted during one communication time slot.

Figure 8:
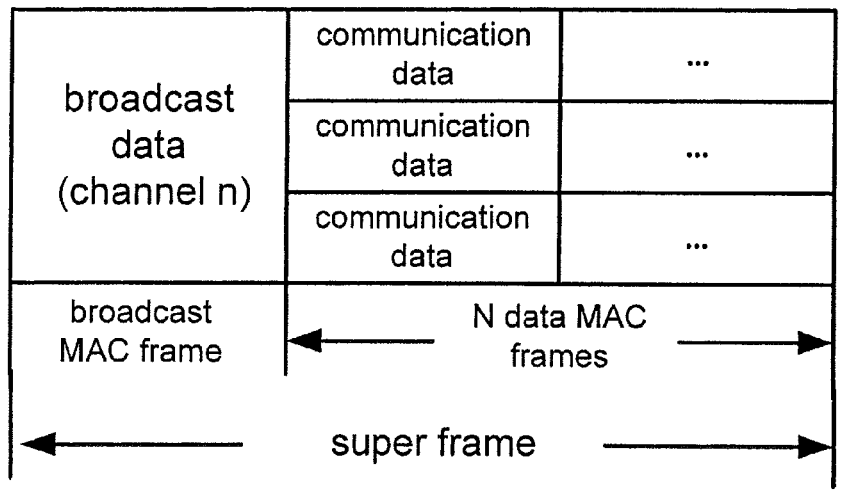
FIG. 8 is a schematic diagram showing the structure of a super frame in the second resource allocation instance of the present invention.

FIG. 8 shows the structure for a super frame in the resource allocation scheme of this embodiment. The central control node can control the broadcast data transmitting and receiving device corresponding to each sector in the base station to transmit one or more broadcast MAC frames on the same channel during the broadcast time slot, while the communication data transmitting and receiving device transmits multiple (given N) data MAC frames in the communication slot, with each MAC frame probably having the same length, such as 3~5 ms.

Figure 9:
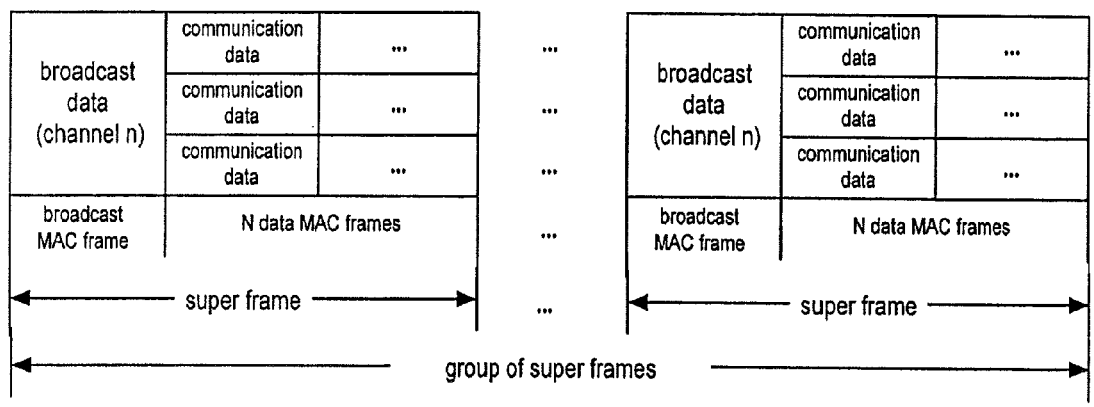
FIG. 9 is a schematic diagram showing a group of super frames formed of the super frame structure of FIG. 8.

In this way, a number of the super frames shown in FIG. 8 constitute a group of super frames for one cycle of broadcast as shown in FIG. 9. Given that N=10, each MAC frame has a length of 5 ms, twenty channels are available, and only one time slot is transmitted per cycle for the content on each channel; the terminal can sleep for (20×11×5−5) ms=1095 ms after burstly receiving broadcast data of 5 ms on some broadcast channel, and needs to wake up for 5 ms only upon the next reception of broadcast data on the same channel. This can desirably ensure that the terminal will not wake up frequently from its sleeping state during the reception of broadcast data on certain channels, and the power consumption of the terminal can thus be saved. It will be appreciated that the frame used in this embodiment and the super frame formed of the frame can be designed in other structures depending on the actual communication conditions.

The above explains the resource allocation scheme through the embodiment of one base station in the cellular network. It can be understood that for all the synchronized base stations in the cellular network system, the broadcast data to be broadcast in the broadcast time slot can be the broadcast data on the same channel or on different channels.

In another embodiment of a resource allocation scheme, when data communication and broadcast communication go on simultaneously in the entire time domain, the frequency band for broadcast communication is part of the overall frequency band of the cellular network. The frequency band allocated for broadcast communication is shared in the cellular network system. In other words, the broadcast data transmitting and receiving device, which corresponds to each sector of each base station in the cellular network system, transmits broadcast data with the same frequency band, and the broadcasting is temporally continuous.

If the frequency band allocated for broadcast communication is part of the entire bandwidth of the cellular network, the remaining frequency band can be allocated to the base stations in the cellular network according to the multiplexing factor. Then, each sector is allocated with the associated frequency band based on the number of sectors in each base station. For example, if the frequency band of the cellular network is 20 MHz, the frequency band allocated for broadcast communication is 2 MHz and the multiplexing factor is three, the base station of each cell in the cellular network is allocated with (20−2)/3=6 MHz, and each sector is allocated with 2 MHz in the case of the base station containing three sectors. In this way, in each base station, different sectors will not be interfere with each other when transmitting broadcast data and communication data simultaneously.

Figure 10:
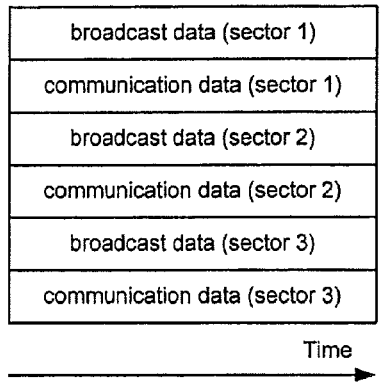
FIG. 10 is a schematic diagram showing a frame structure in another example of the second resource allocation instance of the present invention.

FIG. 10 shows a schematic diagram for the structure of a frame transmitted by a base station when the frequency band is allocated for broadcast and communication in the frequency domain. The central control node controls the communication data transmitting and receiving device for each sector in the coverage of the base station to transmit and receive communication data at a subband in the whole time domain. Meanwhile, the central control node also controls the broadcast data transmitting and receiving device for each sector in the coverage of the base station to transmit and receive broadcast data at a predetermined band (different from the subband for the sector) in the whole time domain.

Assuming the frequency band for transmitting broadcast data is WBG and the entire frequency band allocated to a certain base station is WBJ, the frequency bands for three sectors in the base station are WBJ1, WBJ2 and WBJ3. The broadcast data transmitting and receiving device for each sector in the base station operates at the subband of WBG, while the communication data transmitting and receiving device for each sector in the base station operates at respective operating bands. For example, the communication data transmitting and receiving device for sector 1 in the base station carries out the transmission and reception of communication data using WBJ1, the communication data transmitting and receiving device for sector 2 carries out the transmission and reception of communication data using WBJ2, and the communication data transmitting and receiving device for the sector 3 carries out the transmission and reception of communication data using WBJ3.

Figure 11:
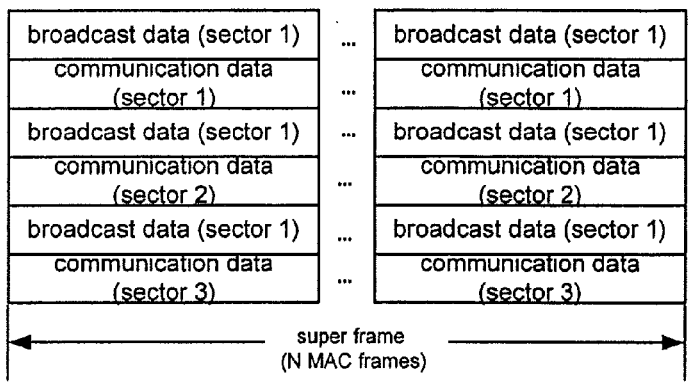
FIG. 11 is a schematic diagram showing the structure of a super frame in the second resource allocation instance of the present invention.

As shown in FIG. 11, with such an allocation scheme, one or more broadcast MAC frames on the same channel can be transmitted within the broadcast frames of one super frame, or broadcast MAC frames on multiple channels can be transmitted within one broadcast frame. Similarly, one or more data MAC frames can be transmitted within communication frames of one super frame. The broadcast MAC frame may have the same or different length as or from that of the data MAC frame. Further, the mobile terminals in the network can remain awake only during data transmission and reception and enter the sleeping state at any other time.

Figure 12:
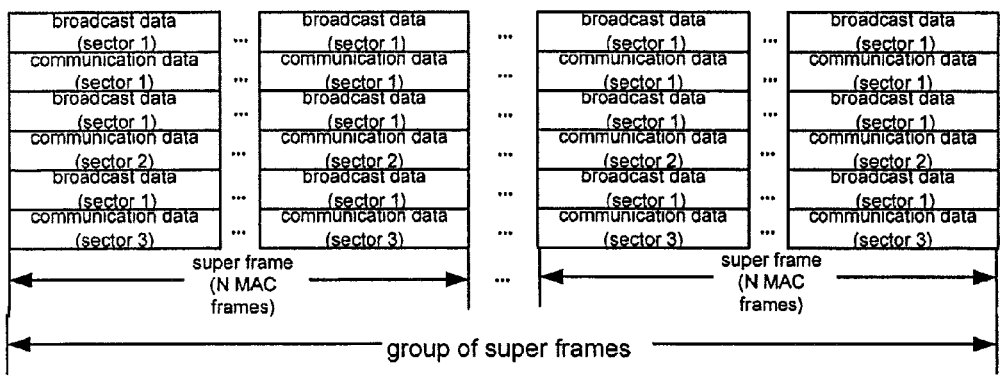
FIG. 12 is a schematic diagram showing a group of super frames formed of the super frame structure of FIG. 11.

In this way, as shown in FIG. 12, when a number of the super frames shown in FIG. 11 constitute a group of super frames for one cycle of broadcast, given that each channel needs to occupy 10 broadcast frames, each MAC frame has a length of 5 ms, and twenty channels are available; the terminal can sleep for (19×10×5) ms=950 ms after burstly receiving broadcast data of 10×5 ms=50 ms on a certain broadcast channel, and needs to wake up for 50 ms only upon the next reception of broadcast data on the same channel. This can ensure the terminal will not wake up frequently from its sleeping state during the reception of broadcast data on a certain channel, and the power consumption of the terminal can thus be saved. It will be appreciated that the frame used in this embodiment and the super frame formed of the frame can be designed in other structures depending on the actual communication conditions.

The above explains the resource allocation scheme through the embodiment of one base station in the cellular network. It can be understood that for all the synchronized base stations in the cellular network system, the broadcast data to be broadcast in the same broadcast time slot can be the broadcast data on the same channel or on different channels.

With the cellular network system and the method for realizing broadcast and data communication of this embodiment, video broadcast and data communication can be incorporated in the sectorized cellular network system while avoiding a lowered efficient use of frequency spectrum during video broadcasting due to sectorization. Moreover, frequency spectrum and/or time resource allocated to broadcast and communication can be controlled by the central control node so as to achieve maximum improvement on the utilization efficiency of the frequency spectrum.

Further, these embodiments are applicable to the cellular networks in each city or each region. For different cities or regions, the same or different frequency bands can be employed for broadcast communication and data communication.

The present invention has been described in connection to several embodiments. It will be appreciated for those skilled in the art that various changes, substitutions and additions can be made in the spirit and scope of the present invention. Therefore, the scope of the present invention is not limited by the above specific embodiment, and it should be defined by the appended claims.

What is claimed is:

1. A cellular network system comprising:
    a central control node connected to a plurality of base stations, for generating control information including operating frequency band and operating time, which are allocated to respective sectors covered by respective base stations in the network and used for broadcast communication and data communication, respectively, and sending said control information to said respective base stations;
    the plurality of base stations for obtaining video broadcast data and, based on said control information, controlling its covered sectors to send the video broadcast data to said terminals via wireless channels within the operating frequency band and operating time allocated for the broadcast communication and performing data communication with said terminals within the operating frequency band and operating time allocated for the data communication; and
    wherein the operating frequency band and operating time allocated for the broadcast communication for all the sectors covered by all of the plurality of base stations in the cellular network are the same, while the operating frequency bands allocated for the data communication are allocated to the plurality of base stations in the cellular network according to a multiplexing factor, and each sector is allocated with an associated operating frequency band based on a number of sectors covered by each base station, wherein each of the plurality of base stations transmits a super frame to its covered sectors, the super frame constituted by the video broadcast data and the data communication data, where the video broadcast is assigned to the operating frequency band and the operating time slots allocated thereto, while the data communication data is assigned to the time slots allocated thereto and to the respective operating frequency bands allocated to a sector to which the data communication data is destined.

2. The cellular network system according to claim 1, wherein the coverage of each of said base stations is divided into sectors, and each of said base stations comprises broadcast data transmitting and receiving devices, the number of which corresponds to the number of the divided sectors and which obtains the video broadcast data, and sends it to said terminals via wireless channels based on said control information; and communication data transmitting and receiving devices, the number of which corresponds to the number of the divided sectors and which performs data communication with said terminals based on said control information.

3. The cellular network system according to claim 2, wherein said base station further comprises a time/frequency control device which controls the operating frequency and the operating time slot of each of the broadcast data transmitting and receiving devices and the communication data transmitting and receiving devices corresponding to each sector.

4. The cellular network system according to claim 2, wherein each of said broadcast data transmitting and receiving devices comprises:
  a link and network message processing unit for acquiring the video broadcast data from a content server and packetizing it into corresponding broadcast data packets;
  a baseband processing unit for performing baseband signal processing on the broadcast data packets to be sent to said terminals so as to form baseband broadcast signals; and
  a radio frequency unit for converting the broadcast data packets into corresponding radio frequency signals to be sent.

5. The cellular network system according to claim 2, wherein each of said communication data transmitting and receiving devices comprises:
  a link and network message processing unit for controlling message transmission in accordance with link protocol and packetizing the message of communication data into corresponding communication data packets;
  a baseband processing unit for encoding and modulating the communication data packets from the link and network message processing unit as well as decoding and demodulating the communication data from a radio frequency unit; and
  a radio frequency unit for converting the baseband communication signals to be sent to the terminals into corresponding radio frequency signals as well as converting the radio frequency signals received from the terminals into corresponding baseband communication signals.

6. A method for realizing broadcast communication and data communication in a cellular network comprising the steps of:
  generating control information using a central control node, wherein the control information includes operating frequency band and operating time which are allocated to respective sectors covered by respective base stations in the network and used for the broadcast communication and the data communication, respectively;
  sending said control information using the central control node to said respective base stations;
  controlling with its respective base station based on said control information each of the covered sectors to send broadcast data within the operating frequency band and operating time allocated for the broadcast communication; and
  transmitting and receiving communication data using the base station within the operating frequency band and operating time allocated for the data communication; and
  wherein the operating frequency band and operating time allocated for the broadcast communication for all the sectors covered by all of the plurality of base stations in the cellular network are the same, while the operating frequency bands allocated for the data communication are allocated to the plurality of base stations in the cellular network according to a multiplexing factor, and each sector is allocated with an associated operating frequency band based on a number of sectors covered by each base station,
  wherein each of the plurality of base stations transmits a super frame to its covered sectors, the super frame constituted by the video broadcast data and the data communication data, where the video broadcast is assigned to the operating frequency band and the operating time slots allocated thereto, while the data communication data is assigned to the time slots allocated thereto and to the respective operating frequency bands allocated to a sector to which the data communication data is destined.

7. The method according to claim 6, wherein
  the frequency band used for the broadcast communication is all or part of the frequency band of the cellular network during the time for sending the broadcast data, all the base stations in the cellular network send the broadcast data at the same frequency band at the time of broadcasting;
  after the end of the operating time for sending the broadcast data, the base stations are capable of performing data communication during the time for data communication; and
  some time slots in the super frame are allocated to the broadcast communication data, and other time slots in the super frame are allocated to the data communication data.

8. The method according to claim 7, wherein
  when the frequency band for the broadcast communication is part of the entire bandwidth of the cellular network, the remaining frequency band of the cellular network is allocated to the base stations in the cellular network according to a multiplexing factor, then each sector is allocated with associated frequency band based on the number of sectors covered by each base station, and the base stations are capable of performing both the broadcast communication and the data communication simultaneously in the operating time for sending the broadcast data, and
  some operating frequency bands in the super frame are allocated to the broadcast communication data, and other operating frequency bands in the super frame are allocated to the data communication data.

9. The method according to claim 6, wherein
the frequency band for the broadcast communication is part of the entire bandwidth of the cellular network, the broadcast data is broadcast at the same frequency band in the whole time domain in the sectors covered by all the base station in the cellular network; and
the remaining frequency band of the cellular network is allocated to the base stations in the cellular network according to a multiplexing factor, each sector is allocated with an associated frequency band based on the number of sectors covered by each base station, the data communication is capable of performing at the allocated frequency band in the whole time domain in respective sectors covered by all the base station in the cellular network, and
some operating frequency bands in the super frame are allocated to the broadcast communication data, and other operating frequency bands in the super frame are allocated to the data communication data.

* * * * *